(12) United States Patent
Gaupp et al.

(10) Patent No.: US 7,273,220 B2
(45) Date of Patent: Sep. 25, 2007

(54) WHEEL SUSPENSION

(75) Inventors: Andress Gaupp, Waldenbuch (DE);
Wolfgang Mödinger, Weinstadt (DE);
Achim Ritzmann, Neuhausen (DE)

(73) Assignee: DaimlerChrysler AG, Stuttgart (DE)

( * ) Notice: Subject to any disclaimer, the term of this patent is extended or adjusted under 35 U.S.C. 154(b) by 377 days.

(21) Appl. No.: 11/063,338

(22) Filed: Feb. 22, 2005

(65) Prior Publication Data

US 2006/0186629 A1    Aug. 24, 2006

(51) Int. Cl.
*B60G 7/00* (2006.01)

(52) U.S. Cl. .................. 280/124.134; 280/86.758; 384/222

(58) Field of Classification Search ......... 280/124.108, 280/124.125, 124.126, 124.134, 124.135, 280/124.136, 124.138, 124.143, 124.145, 280/124.146, 93.51; 29/897.2
See application file for complete search history.

(56) References Cited

U.S. PATENT DOCUMENTS

| | | | | |
|---|---|---|---|---|
| 4,139,246 A | * | 2/1979 | Mikoshiba et al. | ......... 384/222 |
| 4,721,326 A | * | 1/1988 | Massos et al. | ........ 280/124.134 |
| 5,009,448 A | * | 4/1991 | Kijima et al. | .......... 280/124.134 |
| 5,016,903 A | * | 5/1991 | Kijima et al. | .......... 280/124.134 |
| 5,607,177 A | * | 3/1997 | Kato | .................... 280/124.134 |
| 2002/0050694 A1 | * | 5/2002 | Mikasa et al. | ......... 280/86.758 |

FOREIGN PATENT DOCUMENTS

| | | | |
|---|---|---|---|
| DE | 41 42 587 | | 7/1992 |
| EP | 0 340 73.8 | | 11/1989 |
| JP | 55 119510 | | 9/1980 |
| JP | 61127932 A | * | 6/1986 |
| JP | 04059405 A | * | 2/1992 |

* cited by examiner

*Primary Examiner*—Paul N. Dickson
*Assistant Examiner*—Tiffany L. Webb
(74) *Attorney, Agent, or Firm*—Klaus Bach

(57) ABSTRACT

In a wheel suspension for a motor vehicle, comprising an A-arm with front and rear pivot bearings for connection to a vehicle body via A-arm-bearing eyes receiving, pressed into them, elastic bearings, at least the front bearing includes an inner tube and an outer tube with an elastic element disposed therebetween wherein the inner tube is axially engaged by a bearing console of the vehicle body and the outer tube is disposed, together with the elastic element, axially displaced forwardly from the center of the bearing eye.

6 Claims, 1 Drawing Sheet

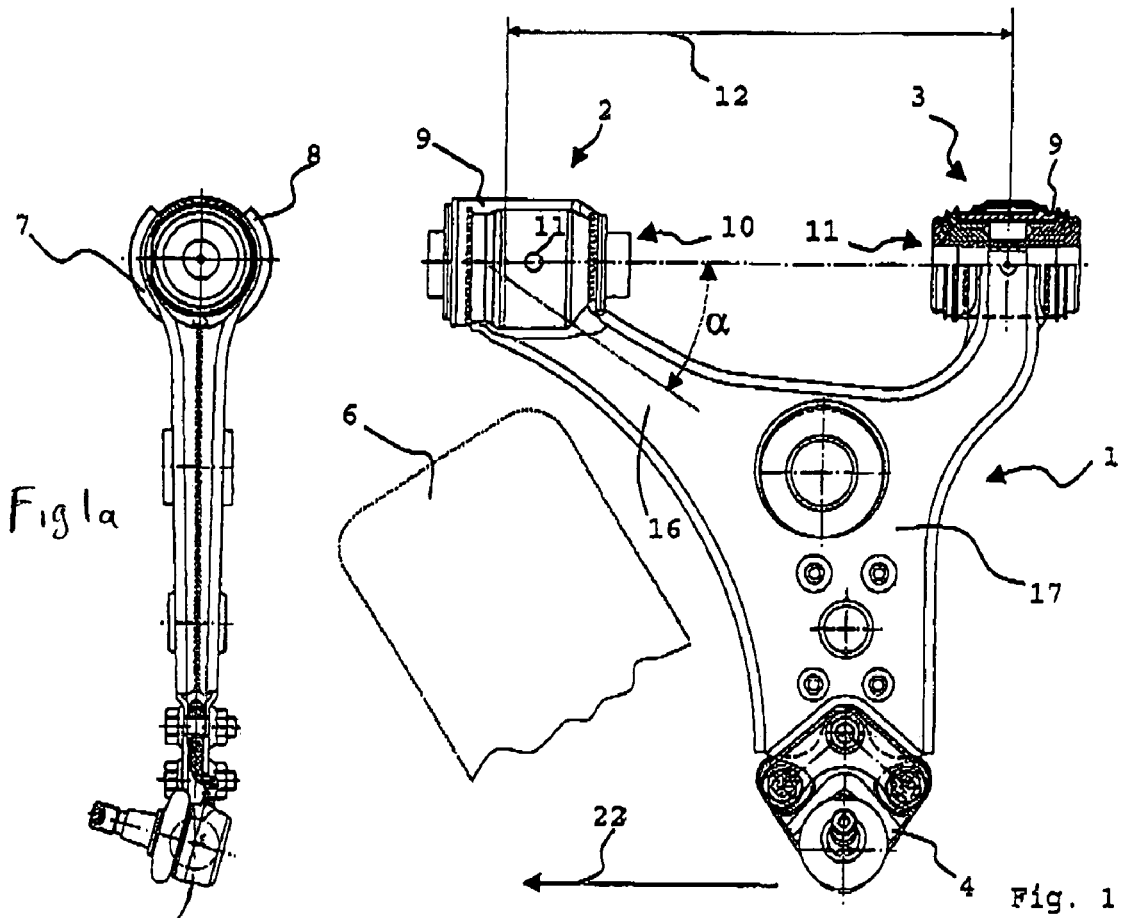
Fig. 1a
Fig. 1
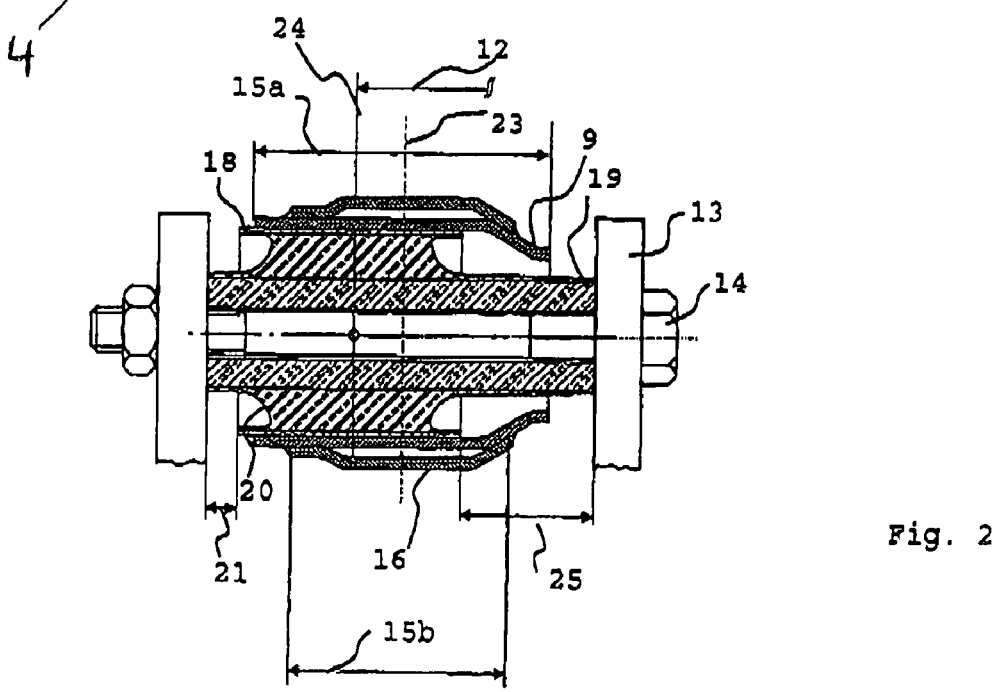
Fig. 2

WHEEL SUSPENSION

BACKGROUND OF THE INVENTION

The invention relates to a wheel suspension for a motor vehicle including a wheel guide arm structure supported with one end on the vehicle body by bearing structures which are spaced in the longitudinal direction of the vehicle and supporting at the other end a vehicle wheel.

DE 41 42 587 A1 discloses a vehicle wheel guide structure of welded A arms with a front and a rear guide arm bearing. The front guide arm bearing is a single-piece radial bearing with an inner and an outer tube and an elastomer element disposed therebetween. The front bearing is supported by way of the axial ends of the inner tube on a bearing console. By means of a screw bolt the front bearing is mounted on the bearing console and is tightly engaged therein. One arm of the guide arm structure extends normal to the front guide arm bearing.

It is the object of the present invention to provide an A arm support member such that the distance between the A arm bearings, by which the A arm is pivotally mounted on the vehicle body, can be increased by movement of the front bearing forward in the travel direction wherein sufficient free space remains for a steering movement of the vehicle wheels and the A-arm consist of components which are welded together.

SUMMARY OF THE INVENTION

In a wheel suspension for a motor vehicle, comprising an A-arm with front and rear pivot bearings for connection to a vehicle body via A-arm-bearing eyes receiving, pressed into them, elastic bearing elements, at least the front bearing includes an inner tube and an outer tube with an elastic element disposed therebetween wherein the inner tube is axially engaged by a bearing console of the vehicle body and the outer tube is disposed, together with the elastic element, axially displaced forwardly from the center of the bearing eye.

The wheel suspension according to the invention comprises an outer tube which, in the longitudinal direction of a guide arm eye is arranged asymmetrically with respect to the axial center thereof. The axial length of the A-arm eye is determined by strength requirements of the weld connections. The outer tube of the elastic bearing and the elastic element can be substantially shorter than the guide arm eye. By an asymmetric arrangement, that is, by a displacement of the center of the elastic element from the center of the bearing eye in the longitudinal direction the kinematics and the force introduction into the vehicle body can be positively influenced. The inner tube of the elastic bearing has such a length that its axial end faces are in firm contact with a bearing console which is firmly connected to the vehicle body, that is, the inner tube must be at least as long as the bearing eye of the A-arm. Preferably, the inner tube is longer and arranged axially eccentrically with respect to the bearing eye.

In a particular embodiment of the invention, the outer tube of the forward A-arm bearing is displaced from the center of the bearing forwardly in the direction of vehicle travel. In order to provide for the largest possible distance between the front and the rear support points of the A-arm, the outer tube is displaced forwardly in the travel direction but only so far that the elastic element is adequately supported by the eye of the bearing. Depending on the bearing design, the outer tube may also extend beyond the bearing eye of the A-arm. By the forward displacement of the outer tube and the elastic element the distance between the bearing support points of the A-arm can be increased whereby the forces to which the vehicle body is subjected are reduced in an advantageous manner.

In a further embodiment of the invention, the diameter of the bearing eye is decreased in the area which extends beyond the outer tube so that, in that area, the inner and outer diameters of the bearing structure are reduced. In this way, the bearing eye is stiffened by the radially extending wall structure and also more construction space is available for adjacent vehicle components.

The A-arm may be formed from pressed sheet metal including an upper and a lower sheet metal shell which are welded together and also together with the bearing eye engaged therebetween. Such an arrangement provides for a low-cost manufacture of the A-arm.

In a preferred embodiment of the invention, the front bearing of the A arm is attached to the A-arm under an angle $\alpha$ which is less than 40°. The front end of the A-arm extends with regard to the travel direction under an angle $\alpha$ which is as small as possible but preferably not larger than 40° in order to permit a steering obliquity of the wheel as large as possible in order to provide for the smallest possible turning circle of the vehicle.

Preferably, the shell parts of the A-arm extend snugly around the bearing eye so that they can be welded to the bearing eye by a sufficiently large weld seam and the required strength of the connection of the bearing eye with the metal parts can be provided.

Preferably, the part of the A-arm structure extending around the eye is provided with a bore by way of which liquid which may be introduced into the hollow areas of the A-arm for example by immersion into a corrosion protection liquid can be drained.

The invention will become more readily apparent from the following description of a preferred embodiment thereof on the basis of the accompanying drawings.

BRIEF DESCRIPTION OF THE DRAWINGS

FIG. 1 is a top view of an A-arm for supporting a vehicle wheel,

FIG. 1a is a side view of the A-arm, and

FIG. 2 is an enlarged cross-sectional view of a bearing structure of the A-arm of FIG. 1.

DETAILED DESCRIPTION OF THE INVENTION

In FIGS. 1, 1a and 2 identical components are designated by the same reference numerals.

Vehicle wheels are connected to the vehicle body by way of the wheel suspensions. The wheel suspensions should provide for easy steerability of the front wheels, an accurate guiding of the wheels and an attenuation of the tire rolling noises to prevent their transmission to the vehicle body. Furthermore, the forces transmitted from the wheel to the vehicle body should be kept as small as possible because of the strength requirements of the components involved and their durability. Often the wheel suspension or parts of the wheel support structure are not directly connected to the vehicle body but to an intermediate sub-frame. The wheel suspension sub-frame is mounted to the vehicle body by way of rubber supports which provide for an essentially firm connection. Below only the vehicle body will be referred to but, in principle, in this connection the sub-frame is considered to be part of the vehicle body.

The wheel suspension with which the present invention is concerned is a front wheel suspension wherein a wheel support structure of the vehicle, which is not shown, supports the A-arm 1 via a spring arrangement or, for example, a McPherson strut which is not shown. The A-arm 1 is mounted to the vehicle body via front and rear mounting points 2, 3, which are spaced from each other in the longitudinal direction 22 of the vehicle. The mounting points 2, 3 are elastic pivot bearings which permit pivoting of the A-arm 1 transverse to the vehicle travel direction. As shown in FIG. 2, the connecting points are joined to the vehicle body based bearing consoles 13 by bolts 14 extending through the pivot bearings. The support member 4 supporting the wheel 6 is connected to the end of the A-arm and is generally a ball joint which permits pivoting of the vehicle wheel for steering purposes. The support member or ball joint 4 is bolted to the A-arm.

The A-arm shown in FIG. 1 and 1a comprises an upper and a lower sheet metal shell 7, 8. The metal shells 7, 8 have front and rear parts 16 and respectively 17 whose ends extend at the mounting points 2, 3 around the bearing eyes 9 and are welded thereto. They have an overall axial length 15b.

The force level transmitted at the mounting points 2, 3 of the A-arm 1 to the vehicle body is largely dependent on the distance 12 between the mounting points 2, 3. In order to transfer by way of the bearing console the smallest possible forces to the vehicle body order to minimize the required strength of the respective body area the distance between the mounting points 2, 3 should be as large as possible. At the same time, care must be taken that sufficient clearance remains between the wheel 6 and the A-arm 1 when the wheel 6 is at the largest steering pivot angle position. In order to obtain a large bearing distance 12, the mounting point 2 is moved forwardly. To ensure the required clearance between the wheel 6 and the A-arm 1, the front part 16 of the A-arm 1 extends toward the mounting point 2 at an angle α of not more than 40° with respect to the pivot axis of the A-arm 1.

FIG. 2 shows the elastic front bearing 10. The bearing comprises an outer tube 18 and an inner tube 19 with an elastomer element 20 of an elastomer material disposed therebetween. The outer tube 18 is pressed into the bearing eye 9, which is welded to the end of the front part 16 of the A-arm 1 and preferably includes a drainage bore 11. The inner tube 19 is connected to the bearing console 13 by the bolt 14. The elastic element 20 is firmly connected to the outer and the inner tubes 18, 19 by vulcanization.

The forces effective in the weld joints of the front part 16 of the A-arm 1 which extends around the bearing eye 9 require the bearing eye to have a certain length which is larger than the length required for the outer tube 18 of the elastic front bearing 10.

In order to provide a bearing distance 12 which is as large as possible, the outer tube 18 is pressed into the bearing eye 9 of the front mounting point 2 asymmetrically in the longitudinal direction. The transverse center line 24 of the elastic element and of the outer tube 18 is displaced forwardly in the travel direction 22 with respect to the center line 23 of the bearing eye 9. It must be made sure that the elastic element 20 finds sufficient support in the bearing eye 9, so that it is spaced from the bearing console 13 by the distances 21 at the front end and the distance 25 at the rear.

It must be made sure that the elastic element 20 finds sufficient support in the bearing eye 9 which has an axial length 15a. The outer tube 18 itself may axially extend forwardly beyond the bearing eye 9 as shown, in FIG. 2. In order to still provide for a firm connection between the elastic bearing 10 and the bearing console 13 the inner tube 19 extends axially rearwardly beyond the bearing eye 9 so as to be in contact with the bearing console 13. The asymmetric arrangement of the outer tube 18 is compensated for by the inner tube 19. The inner tube 19 projects in the forward travel direction 22 beyond the outer tube 18 to a substantially smaller extent than in the opposite direction. The area of the bearing eye 9 extending beyond the outer tube 18 is inwardly constricted to form an inwardly extending reinforcement wall structure.

The shown arrangement of the elastic bearing 10 in connection with the design of the A-arm 1 provide for an advantageous large distance 12 between the A-arm mounting points 2 and 3 resulting in relatively small forces transmitted from the wheel to the vehicle body mounting structures for the A-arm while providing a relatively large clearance for a relatively large steering angle for the steered vehicle wheels.

What is claimed is:

1. A wheel suspension for a motor vehicle with a wheel support arrangement comprising an A-arm (1) longitudinally spaced front and rear parts (16, 17) with mounting points (2, 3) for connection to a vehicle body, at least one of the mounting points (2, 3) of the A-arm (1) comprising a bearing eye (9) which is mounted to the A-arm (1) and into which an elastic bearing (10) is pressed, said elastic bearing (10) having an inner tube (19) and an outer tube (18) with an elastic element (20) disposed therebetween, said inner tube (19) being axially engaged by a bearing console (13) of the vehicle body and the outer tube (18) being disposed in the bearing eye (9) asymmetrically with respect to the center of the bearing eye (9) of the A-arm (1), the outer tube (18) of the elastic bearing (10) being pressed only partially into the bearing eye (9) and the area of the bearing eye (9) extending beyond the outer tube (18) being inwardly constricted to form an inwardly extending reinforcement wall structure.

2. A wheel suspension according to claim 1, wherein the outer tube (18) of the elastic bearing (10) at the front mounting point (2) of the A-arm (1) is displaced from the center of the bearing eye (9) forwardly in the travel direction (22) of the motor vehicle.

3. A wheel suspension according to claim 1, wherein the A-arm is a sheet metal structure comprising two shells disposed on top of one another and welded together and including front and rear parts (16, 17) each extending around a bearing eye (9) and being also welded to the bearing eye (9) engaged therebetween.

4. A wheel suspension according to claim 3, wherein the front part (16) of the A-arm (1) is joined to the bearing eye (9) at an angle of not more than 40° with respect to the axis of the bearing eye (9).

5. A wheel suspension according to claim 3, wherein the A-arm includes front and rear A-arm parts (16, 17) each engaging one of the bearing eyes.

6. A wheel suspension according to claim 5, wherein a drainage bore (11) is formed in each of the A-arm parts (16, 17) in the area where they extend around a bearing eye (9).

* * * * *